UNITED STATES PATENT OFFICE.

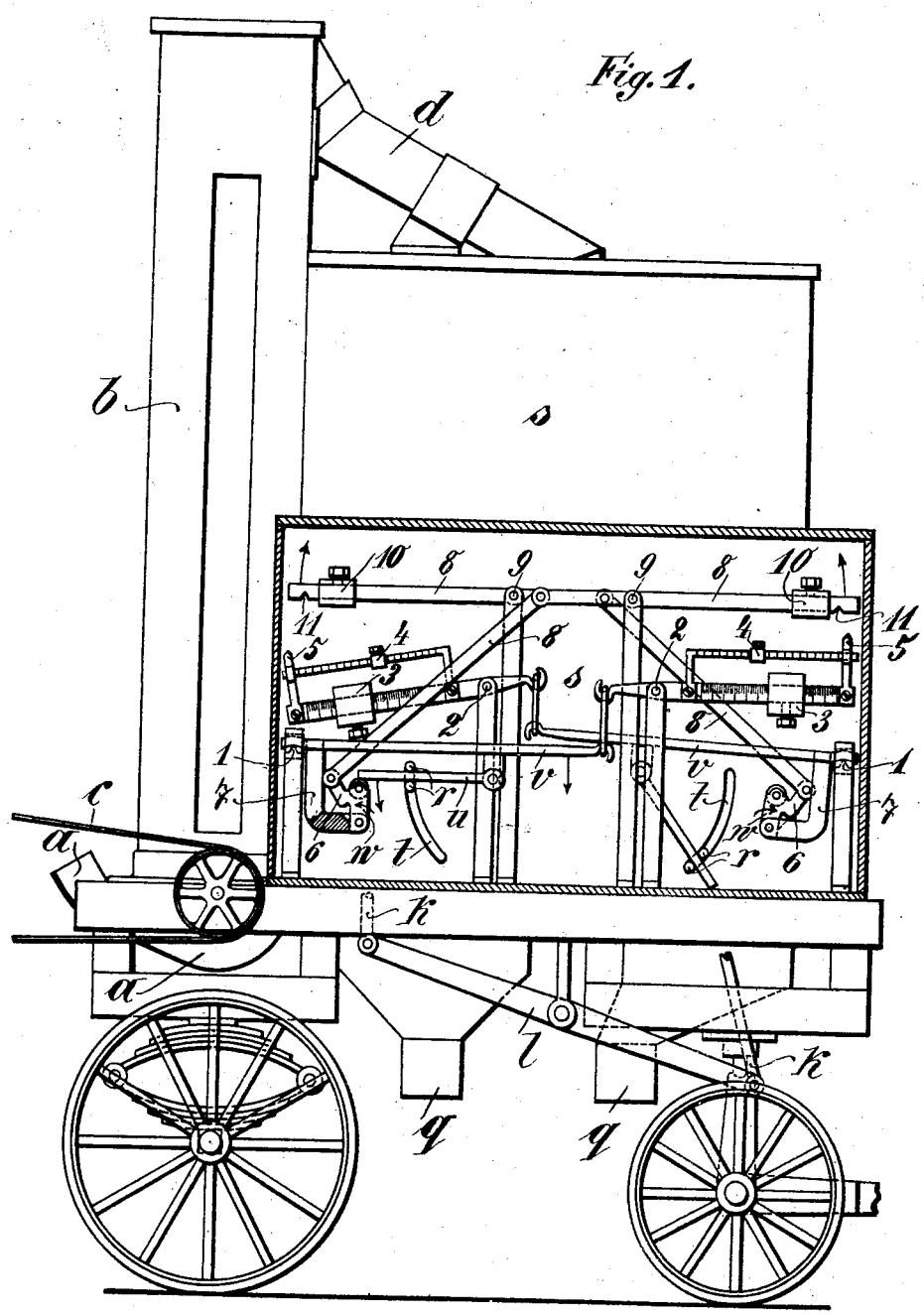

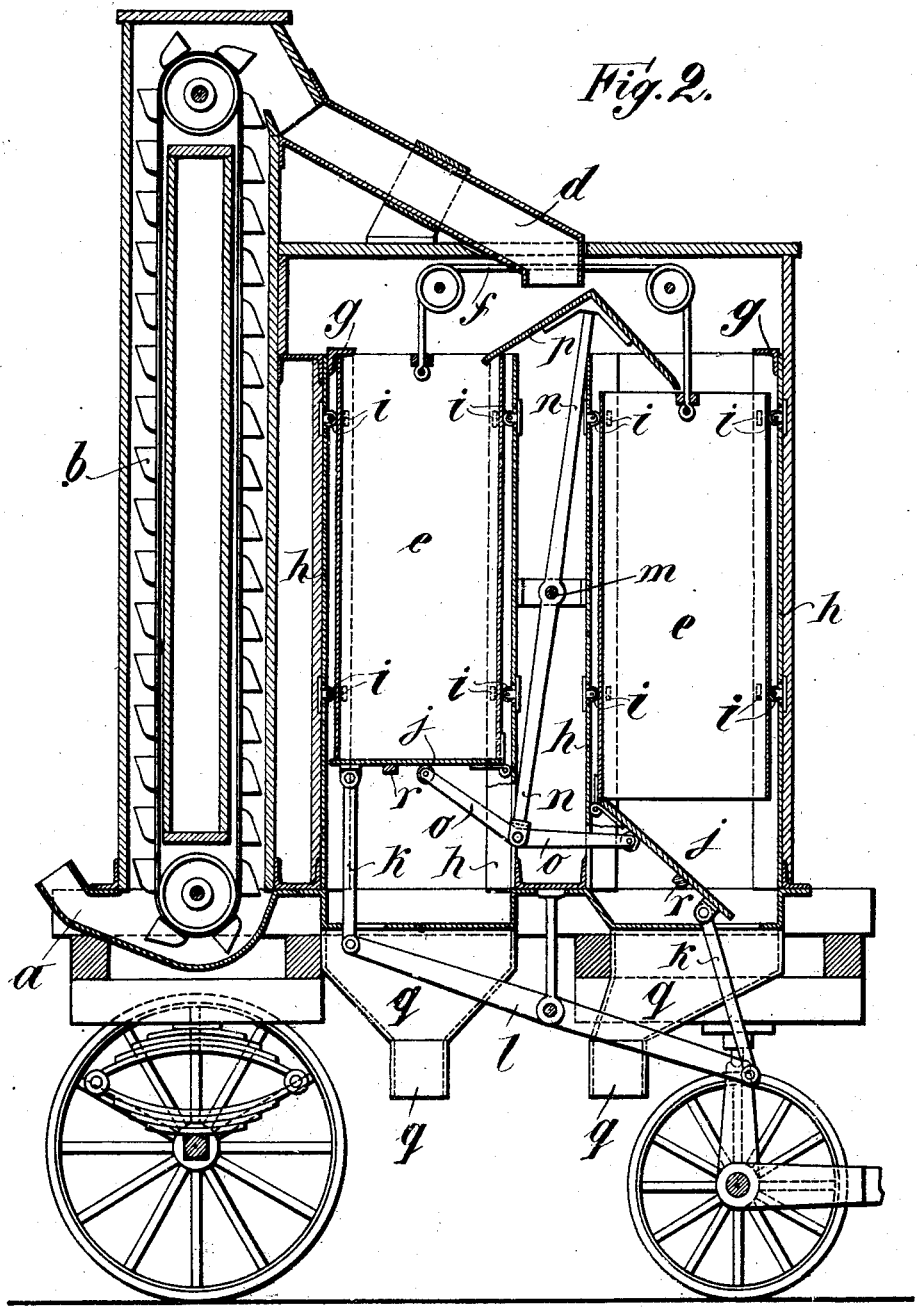

ANDREAS OPPERMANN, OF RHODEN, NEAR OSTERWIECK, GERMANY.

MACHINE FOR WEIGHING GRAIN.

No. 916,582.  Specification of Letters Patent.  Patented March 30, 1909.

Application filed September 19, 1906, Serial No. 335,174. Renewed September 29, 1908. Serial No. 455,326.

*To all whom it may concern:*

Be it known that I, ANDREAS OPPERMANN, merchant, a subject of the German Emperor, and resident of Rhoden, near Osterwieck, in the district of Halberstadt, Germany, have invented new and useful Improvements in Machines for Weighing Grain or the Like, of which the following is a specification.

This invention relates to a transportable weighing machine for weighing grain delivered from a threshing machine or for like purposes, the weighing being after a known principle accomplished automatically by the alternate filling of two weighing receptacles.

According to the present invention after one weighing receptacle is filled with a predetermined weight of grain, the hinged bottom of the same which was held closed by a catch during the filling of the receptacle opens automatically the catch being released under the weight of the grain, and effecting an automatic discharge. The hinged bottoms of the two receptacles are so connected that when one opens it closes the other and vice versa while further the distributer or feed chute which leads the grain from a charging hopper to the weighing receptacles, is at the same time swung over the empty receptacles, so that immediately after the automatic opening of the hinged bottom of the filled receptacle the filling of the empty receptacle begins.

A transportable weighing machine according to the invention is shown in the accompanying drawings, in which:

Figure 1 shows the weighing machine in elevation with the casing inclosing the weighing arrangement in section. Fig. 2 shows a longitudinal section through the grain receptacles of the weighing machine.

The weighing arrangement is preferably mounted on a car, so that the weighing machine can be driven behind the threshing machine, from which the grain is conducted into the inlet opening, $a$, of an elevator, $b$, which is driven from the threshing machine by a belt, $c$. The elevator, $b$, raises the threshed grain to the charging hopper, $d$, of the weighing machine, from which it passes to the receptacles, $e$, of the weighing machine.

The receptacles, $e$, are connected by a cable, $f$, passing over rollers, so that when one receptacle moves downward the other is correspondingly raised. The up and down movement of the receptacles $e$, is limited by suitable stops, $g$, which are fastened to rails, $h$, (Fig. 2) provided with rollers, $i$.

Each of the receptacles, $e$, is provided with a hinged or pivoted bottom, $j$, each being connected by means of a link, $k$, to a two-arm lever, $l$, so that when one bottom opens it closes the other.

Between the receptacles, $e$, a two arm lever, $n$, is mounted on a pivot, $m$. The lever, $n$, carries at its lower end an angle lever, $o$, which is pivoted at its center, and is provided at each of its ends with rollers. The arms of the angle lever, $o$, are of such length, that the rollers touch the bottoms, $j$, as may be seen from Fig. 2. To the upper end of the two arm lever, $n$, the hood shaped distributer or chute, $p$, with sloping surfaces is fitted, and is held by the angle lever, $o$, in such a position, that the corresponding sloping surface of the distributing hood, $p$, for the grain flowing from the charging hopper, $d$, is constantly held in position over the receptacle the bottom of which is closed. Immediately this receptacle is filled and the bottom, $j$, of the same is automatically opened, the lever, $o$, is turned on its pivot by the opening of the bottom and also swung from one side to the other. The distributer or chute, $p$, is forced to take part in this swinging movement so that immediately after the opening of the bottom, $j$, in question, the distributer, $p$, is swung over the empty receptacle and the filling of the latter is commenced, the opened receptacle being now emptied, the grain flowing through the outlet, $q$, into a sack held to or suspended from it.

In the middle of each bottom, $j$, a rail, $r$, (Fig. 2) is arranged, the rail passing through a slot, $t$, in the casing, $s$, inclosing the receptacles, $e$. The rails are forked at their front ends (Fig. 1) the forked ends of the rails, $r$, engaging movable arms, $u$, fitted to scale beams, $v$. Each arm, $u$, rests at one end on a movable catch, $w$. Each beam, $v$, is suspended on a knife edge, 1, and at the opposite end beyond its pivot 2 provided with a main running weight, 3, and an auxiliary weight, 4. A trigger, 5, on each weight beam acts to release the catch, $w$, when the receptacle in question has received the required amount of grain to be weighed.

Each catch, $w$, consists of a bent angle lever, 6, one arm of which is pivoted to an arm, 7, fastened to the scale beam, $v$, while the other arm of the catch, $w$, is pivoted to a lever, 8, adapted to turn on a pivot, 9, and loaded on the other side of its fulcrum by a weight, 10, by means of which the catch, w, is generally held in the position shown at the left in Fig. 1. The catches, w, are so constructed that they cannot be moved by the weights 10 beyond the vertical position in the opposite direction to that indicated by the arrow shown in Fig. 1.

The whole weighing arrangement works as follows. According to the form of construction shown in the drawings, first the left hand receptacle, e, is filled with the grain supplied through the hopper, d, and flowing over the chute, p. As the receptacle is filled it gradually sinks downward. With the downward movement of the receptacle, the bottom, j, of the latter, resting on the respective arm, u, by intermediary of the forked arm, r, the scale beam, v, is turned or lowered about the knife edge 1 in the direction of the arrow (Fig. 1) so that weight, 3, is raised. Shortly before the receptacle, e, has reached its lowest position, in which the second receptacle, e, strikes against the stop, g, (Fig. 2) the beam carrying the weight, 3, is raised so high, that the arm, 5, encounters a notch, 11, of the weighted lever, 8, the latter being thereby raised against the action of its weight in the direction of the arrow. On the other side of its pivot, 9, the lever, 8, swings down and draws with it the catch, w, in the direction of the arrow, so that the catch, w, is drawn away from below the arm, u. Thereupon the bottom j, which has been locked up to this moment is released, and is opened by the weight of grain resting on it. By the opening of this bottom, as already described the other bottom is closed by the lever connection, k, l, and the distributing hood is swung over by the lever connection, n, o, so that the grain runs into the empty receptacle. The catch, w, that was drawn back, assumes immediately after the opening of the bottom, j, the vertical position by the action of the weight 10. On the rising of the bottom, j, the arm, u, is also raised by the fork, r, so that its front end forces the catch, w, back in the direction of the arrow against the action of the weight 10. As soon as the arm, u, has passed the catch, w, the latter is by the weight 10 brought back into its normal position so that the arm, u, rests now again on the catch, w.

Having thus fully described my invention, what I claim and desire to secure by Letters Patent is:

1. An automatic transportable grain weighing machine, comprising in combination with two weighing receptacles dependently connected to each other and having each a hinged bottom, and a distributer movably arranged over said receptacles; a two-arm lever (n) arranged between said receptacles and designed to carry at its upper end said distributer, an angle-lever (o) movably arranged on the lower end of said two-arm lever and having guiding-rollers at its ends to touch said hinged bottoms, catches (w) to keep said bottoms closed, said bottoms being adapted to act, when operated, also to reverse said distributer by swinging said levers (o, n), substantially as described and shown.

2. An automatic transportable grain weighing machine, comprising in combination with two weighing receptacles dependently connected to each other and having each a hinged bottom, of scale beams; arms (u) movably arranged on said scale beams and designed to engage said bottoms, movable catches (w) to keep said arms in position during the filling of said receptacles, weighted levers (8) pivotally connected to said catches, and triggers (5) connected to said scale beams and designed to release said arms from said catches by raising said weighted levers upon said receptacles being wholly filled, for the purpose set forth.

ANDREAS OPPERMANN.

Witnesses:
R. A. OSBORN,
JAMES S. A. BURRELL.